(12) United States Patent
Gaiser et al.

(10) Patent No.: US 9,014,998 B2
(45) Date of Patent: Apr. 21, 2015

(54) SENSOR WITH SUBASSEMBLIES FEATURING STORAGE DEVICES

(75) Inventors: Martin Gaiser, Alpirsbach (DE);
Juergen Haas, Oberwolfach (DE);
Juergen Motzer, Gengenbach (DE)

(73) Assignee: Vega Grieshaber KG, Wolfach (DE)

( * ) Notice: Subject to any disclaimer, the term of this patent is extended or adjusted under 35 U.S.C. 154(b) by 363 days.

(21) Appl. No.: 12/576,559

(22) Filed: Oct. 9, 2009

(65) Prior Publication Data

US 2010/0256942 A1    Oct. 7, 2010

Related U.S. Application Data

(60) Provisional application No. 61/111,424, filed on Nov. 5, 2008.

(30) Foreign Application Priority Data

Nov. 5, 2008  (EP) ..................................... 08168401

(51) Int. Cl.
*G01C 19/00* (2013.01)
*G01D 18/00* (2006.01)
*G01R 31/28* (2006.01)
*G01F 23/284* (2006.01)
*G01F 23/00* (2006.01)

(52) U.S. Cl.
CPC .......... *G01F 23/284* (2013.01); *G01F 23/0069* (2013.01)

(58) Field of Classification Search
CPC .... G01F 25/00; G01F 23/0069; G01F 23/284
USPC ............ 702/104, 108, 116–118, 183; 73/763, 73/865; 29/593
See application file for complete search history.

(56) References Cited

U.S. PATENT DOCUMENTS

| | | | |
|---|---|---|---|
| 4,862,067 A * | 8/1989 | Brune et al. ................. | 324/73.1 |
| 6,314,023 B1 * | 11/2001 | Waldo ....................... | 365/185.09 |
| 6,437,692 B1 | 8/2002 | Petite et al. | |
| 6,489,586 B1 * | 12/2002 | Corral ........................ | 219/121.6 |
| 6,882,950 B1 * | 4/2005 | Jennion et al. ............... | 702/118 |
| 7,184,924 B1 | 2/2007 | Shabino et al. | |
| 7,626,508 B2 * | 12/2009 | Kosuge et al. ................ | 340/612 |

(Continued)

FOREIGN PATENT DOCUMENTS

| | | |
|---|---|---|
| CN | 101283257 | 10/2008 |
| CN | 101424526 | 5/2009 |
| WO | 2007 / 027342 | 3/2007 |

OTHER PUBLICATIONS

Dallas Semiconductor, Maxim, Application 178, www.maxim-ic.com. Printed Circuit Board Identification Using 1-Wire Products, pp. 1-14.

*Primary Examiner* — John Breene
*Assistant Examiner* — Yaritza H Perez Bermudez
(74) *Attorney, Agent, or Firm* — Fay Kaplun & Marcin, LLP

(57) ABSTRACT

A sensor includes an electronic module that comprises several electronic subassemblies and a processor that can be electrically coupled to the electronic subassemblies. The subassemblies respectively feature a programmable storage device with subassembly-specific data of the respective subassembly. The content of the respective programmable storage devices can be read out and evaluated by the processor.

12 Claims, 3 Drawing Sheets

(56) References Cited

U.S. PATENT DOCUMENTS

| | | |
|---|---|---|
| 7,768,413 B2 * | 8/2010 | Kosuge et al. ............... 340/612 |
| 2005/0275527 A1 | 12/2005 | Kates |
| 2006/0007008 A1 | 1/2006 | Kates |
| 2006/0149490 A1 * | 7/2006 | Nam ........................... 702/107 |
| 2006/0179251 A1 | 8/2006 | Fields et al. |
| 2006/0267756 A1 * | 11/2006 | Kates ........................... 340/521 |
| 2008/0155064 A1 * | 6/2008 | Kosuge et al. ............... 709/219 |
| 2009/0082986 A1 | 3/2009 | Pettersson |
| 2009/0295438 A1 * | 12/2009 | Jammula et al. ............. 327/154 |

\* cited by examiner

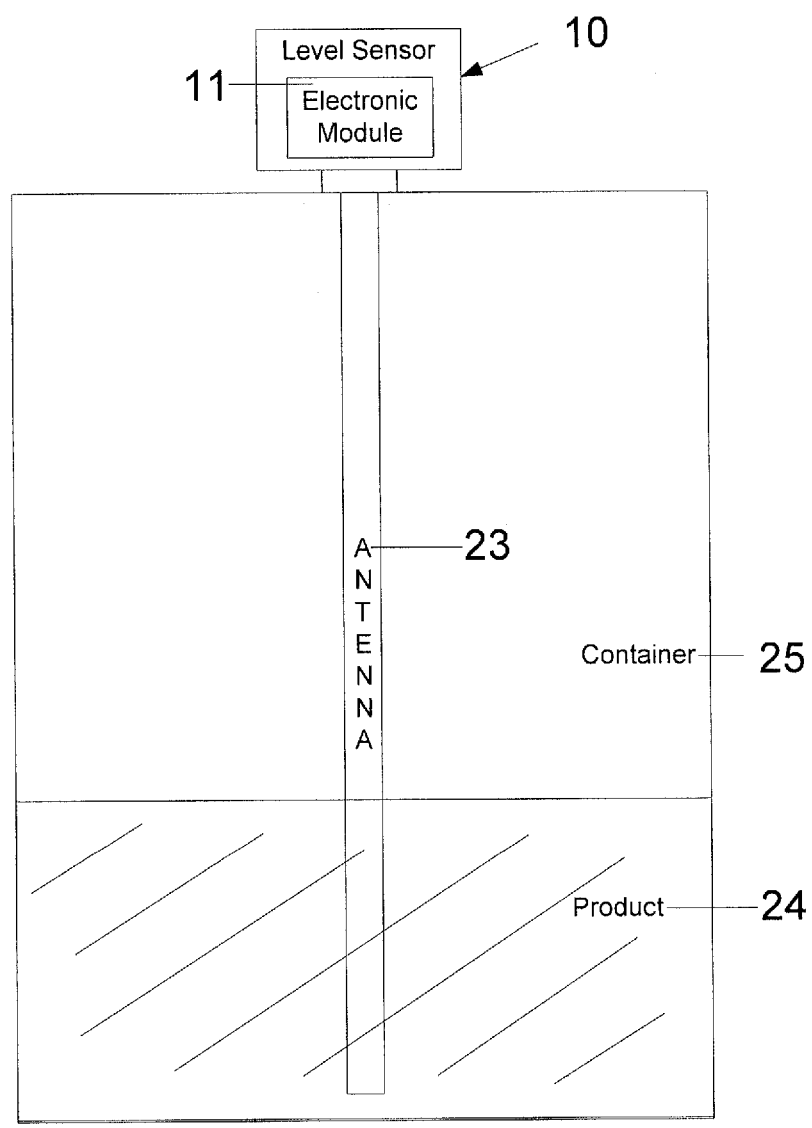

SENSOR WITH SUBASSEMBLIES FEATURING STORAGE DEVICES

REFERENCE TO RELATED APPLICATIONS

This application claims the benefit of the filing date of EP Application Serial No. 08 168 401.1 filed Nov. 5, 2008 and U.S. Provisional Patent Application Ser. No. 61/111,424 filed Nov. 5, 2008, the disclosures of these applications are hereby incorporated herein by reference.

FIELD OF INVENTION

The present invention pertains to a sensor, particularly a level sensor, and to a method for manufacturing a sensor.

TECHNOLOGICAL BACKGROUND

Sensors in the sense of this application may consist of any type of measuring devices such as, for example, level sensors, pressure sensors, limit level sensors or temperature sensors, just to mention a few examples. Thereby, different physical effects can be used for the measurement. The acquisition of measured values can be realized with the aid of radar waves, ultrasound, vibration, guided microwaves (TDR, Time Domain Reflection) or capacitive effects.

Known level sensors for carrying out a contactless measurement comprise an antenna that transmits and receives signals by utilizing the aforementioned effects in order to determine the level of a medium, e.g., in a product container. The antenna of such a level sensor is arranged, for example, within the container above the medium in this case.

The electronic modules of such sensors usually consist of several electronic subassemblies. These subassemblies are frequently installed into different sensors in identical form such that different sensors or sensors with different properties are achieved depending on the respective combination of subassemblies. The electronic subassemblies undergo the required manufacturing and testing steps separately and are not assembled until the completion of the electronic module. In this case, the different electronic subassemblies can only be optically identified such that there is a risk of combining incorrect subassemblies into an electronic module. Until now, such an incorrect assembly could only be detected by means of final functional tests of the electronic modules that are time-consuming and require additional production steps. It would also be conceivable that an electronic subassembly is installed that has not undergone all testing steps. Furthermore, the installation of subassemblies of identical construction into different sensors may require an adaptation and adjustment that once again require an additional production step and come along with higher manufacturing expenditures.

SUMMARY OF THE INVENTION

The described exemplary embodiments may equally apply to the sensor and the method for manufacturing the sensor such that embodiments described with reference to the sensor may also be implemented in the method and vise versa. In addition, the advantages described in connection with the sensor may also be attained with the method for manufacturing the sensor.

The invention further develops the generic state of the art with a sensor that comprises an electronic module comprising several electronic subassemblies and a processor that can be electrically coupled to the electronic subassemblies, wherein the subassemblies respectively feature a programmable storage device with subassembly-specific data of the respective subassembly, and wherein the content of said storage device can be read out and evaluated by the processor. This provides the advantage that the storage devices of the subassemblies can be programmed with data pertaining to the individual subassembly after or during the manufacture and/or after or during the subsequent functional tests of the subassemblies. Consequently, the processor can be provided with specific information regarding the individual subassembly and use this information for realizing an improved operation and an improved coordination of the information exchange and the interaction between itself and the corresponding subassembly, as well as between the respective subassemblies. The results obtained, for example, from a functional test of the subassembly therefore are not discarded again, but rather may serve as the basis for adjusting the operation of the electronic module and the sensor, respectively. This opens up a number of options and advantages associated therewith. For example, the processor can check if the electronic module was assembled correctly, i.e., with the correct subassemblies, after the subassemblies have been assembled. Furthermore, the processor can configure the electronic module in dependence on the respective combination or calibrate the electronic module in dependence on the test results. After the assembly, the processor can also check if the respective subassembly has successfully passed all tests so as to ensure that only subassemblies are sold that were tested to the full extent.

This may ensure and simplify the assembly of individual electronic subassemblies in a sensor.

It may furthermore be advantageous that the storage devices consist of non-volatile storage devices, particularly of serial EEPROMs with a single-wire interface. Due to the utilization of non-volatile storage devices, the data content is permanently preserved in the storage devices of the subassemblies after their manufacture and testing—also after dismounting a subassembly and using this subassembly in another electronic module. The aforementioned EEPROMs may advantageously used for this purpose because they may provide the advantage of not requiring a separate voltage connection, but they draw their energy via the data line. Corresponding supply lines can thusly be saved.

The invention can also be further developed in that the data comprises an identification code for identifying the subassembly and/or the manufacturer. In addition to the automatic check of the correct assembly by the processor and the self-configuration of the electronic module, this identification code also enables the processor to retrieve information on the manufacturer. Consequently, the identification code may also serve as a distinct recognition feature that makes it possible to realize a protection against reproductions and copies because the processor does not accept subassemblies that are not produced by a certain manufacturer or notifies the user or manufacturer (e.g., during the course of repair work).

In this respect, it is proposed that the identification code consists, in particular, of a serial number. Such an individual serial number is only issued once by the manufacturer of the subassembly and explicitly assigned thereto. During the acquisition of such components, the customer can be provided with information on the serial number range. This subassembly serial number can be incorporated into the monitoring process during the configuration of the electronic module and during the subsequent operation of the sensor. In more precise terms, this means that the sensor will check this serial number when it is switched on. If it does not lie within the range expected by the software or does not have the value expected by the software, the sensor will not start its proper operating mode. The aforementioned advantages with respect to the self-configuration of the electronic module, the assembly check and the copy protection can be realized even better in this fashion.

Another embodiment can be realized in that the data comprises test data determined during functional tests of the subassembly. This provides the advantage that a calibration can be realized in dependence on test results. This in turn provides the advantage that the adaptation of the subassembly to the other subassemblies and to the electronic module, respectively, can not only be adjusted to the type of the respective subassembly, but rather to the individual subassembly such that other aspects such as, for example, manufacturing tolerances and error correction may also be realized. According to the invention, it may now be possible to transfer test or inspection results and associated adjustment values of the individual subassemblies into the finished electronic module such that the adaptation of the individual subassemblies can be realized automatically by the processor and a manual adaptation during another production step can be eliminated.

In this context, it may advantageous that the test data comprises measured values or manufacturing irregularities of the subassemblies that were determined by means of tests.

The invention may verify the data with data expected by the processor in order to check whether the subassemblies were correctly assembled. This may provide the advantage that incorrect combinations of the subassemblies can be checked and automatically detected by the processor. For this purpose, the processor checks if the actual subassembly combination corresponds to an intended combination for the desired sensor. For example, an identification code or a serial number may be considered as data for identifying the subassembly. Due to this data, the electronic module may automatically subject itself to a verification of the correct combination after its assembly such that a subsequent functional test to that effect can be eliminated.

Furthermore, it may be proposed that the operation of the electronic module can be configured in dependence on the data. In this case, the processor recognizes the subassembly in question, for example, based on the identification code or the serial number and adjusts the electronic module accordingly based on this information. The processor configures the mutual adjustments between the individual subassemblies and configures the interaction between itself and the respective subassembly. During the configuration, the type of subassembly may be identified and the processor selects the manner of communication between the processor and the corresponding subassembly and possibly between the individual subassemblies with the aid of the aforementioned options. Based on the identification of the subassembly, the processor can, if applicable, also carry out an adjustment of this or the other subassemblies. This means that an assortment of different manners of communication and adjustments is available, from which the processor makes the appropriate selection in dependence on the identification of the subassembly.

According to another further development of the invention, the operation of the electronic module can be calibrated in dependence on the data. In this case, the data may consist of manufacturing and test data. In contrast to the configuration, not only the assignment to a predetermined and numerically defined manner of communication or a set of adjustments is realized in this case, but rather a completely individual adaptation to the stored test results of the subassembly. This includes aspects such as, for example, the compensation of manufacturing tolerances or an error correction that increase the functional accuracy of the finished electronic module. As mentioned above, it is now possible to transfer test and inspection results and associated adjustment values of the individual subassemblies into the finished electronic module such that the adaptation of the individual subassemblies can be realized automatically by the processor and a manual adaptation during another production step can be eliminated.

An exemplary embodiment of the invention is described below with reference to the figures.

BRIEF DESCRIPTION OF THE FIGURES

FIG. 3 shows the level sensor according to the inventive exemplary embodiment.

DETAILED DESCRIPTION OF AN EXEMPLARY EMBODIMENT

Figure 1:
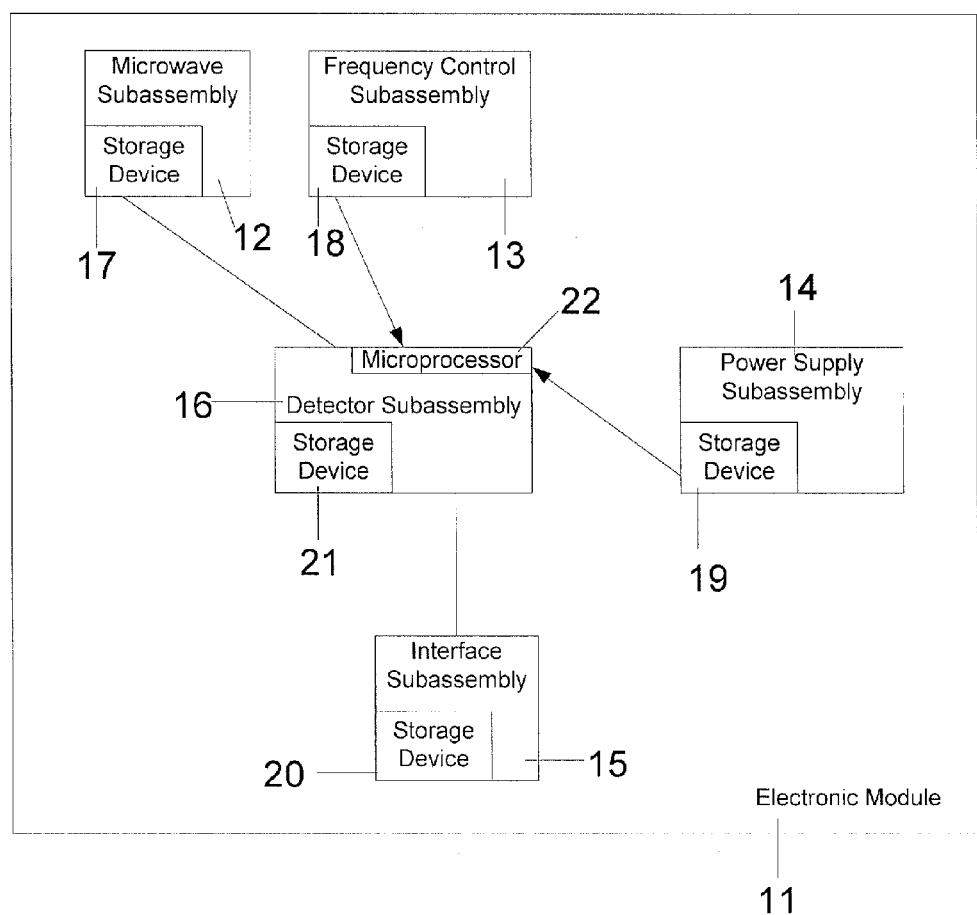
FIG. 1 shows the structure of an electronic module for a level sensor according to one exemplary embodiment of the present invention.

FIG. 3 shows a level sensor 10 according to an exemplary embodiment of the invention. An electronic module 11 is installed in the level sensor 10. The sensor 10 furthermore features an antenna 23 that is arranged within the container 25 such that it protrudes into the product 24 to be measured.

FIG. 1 schematically shows a structure of the electronic module 11 for the level sensor 10 according to an exemplary embodiment of the invention. This electronic module 11 comprises a microwave subassembly 12, a frequency control subassembly 13, a power supply subassembly 14 for supplying the electronic module 11 and the level sensor 10 with power, an interface subassembly 15 and a detector subassembly 16. The individual subassemblies 12-16 respectively feature a storage device 17-21. The respective storage devices 17-21 used consist of non-volatile storage devices that can be electrically programmed and retain the stored data independently of a power supply. It is preferred to utilize serial EEPROMs with a single-wire interface. In addition to a grounding, these EEPROMs only require a single data line, through which they can also obtain their energy.

The detector subassembly 16 also features a microprocessor 22 that can be electrically connected to the individual storage devices 17-21. Furthermore, the electronic subassemblies 12 to 15 may also contain microprocessors that are tailored to special tasks.

The individual subassemblies 12-16 are installed in identical form into several devices in accordance with a modular design. During this process, the subassemblies undergo corresponding manufacturing and testing steps. After the manufacturing steps, manufacture-relevant data such as, for example, an identification code, particularly a serial number, is stored in the respective storage devices 17-21 of the subassemblies 12-16. On one hand, the identification code can provide information on the type of subassembly, and on the other hand, ensure a definitive affiliation with a manufacturer.

In this context, tests such as an Automatic Optical Inspection (AOI), a test for ensuring the explosion protection guidelines (IC-test) or functional tests, particularly with respect to error diagnoses and/or measured value or manufacturing irregularities, could conceivably be used as testing steps. Measured value or manufacturing irregularities are deviations from the desired nominal output values of the subassemblies at a certain input value or at a certain measured variable. Corresponding information is stored in the respective storage devices 17-21 of the subassemblies 12-16 after or during a successful completion of these testing steps, wherein accumulated relevant test data is also stored. This storage can be realized by means of the test device that is connected to the subassembly for this purpose anyway.

One example of a possible data content stored in the storage devices 12-16 is provided in Table 1. The storage module used in this example has a storage capacity of 128 byte and undergoes four testing steps. In other respects, Table 1 is self-explanatory.

consequently also the level sensor 10. For example, different frequencies of the antenna 23 (different radar, microwave or ultrasonic frequencies) or of the microwave subassembly 12 require different adjustments of an analog/digital converter during the signal processing of the detector subassembly 16, wherein the adjustments of the individual subassemblies 12-16 can be carried out by the microprocessor 22 in an independently coordinated fashion.

TABLE 1

| Info | | Storage requirement [byte] | Storage location No. | Format/type |
|---|---|---|---|---|
| Test identification | | 1 | 0 | Status of the test |
| Hardware identification | | 2 | 1, 2 | identification is stored as a number. Displayed in plain text. |
| Hardware index | | 3 | 3 | Compatibility version |
| | | | 4 | Fuctional/defective version |
| | | | 5 | Customer-specific/test version |
| Serial number | | 4 | 6 ... 9 | Serial number of circuit board |
| Test station 1 | Test date | 4 | 10 ... 13 | UNIX date |
| | Test station number | 2 | 14, 15 | Distinct consecutive number |
| | Software status | 3 | 16 | Compatibility version |
| | | | 17 | Function/defective version |
| | | | 18 | Customer-specific/test version |
| | Tester | 2 | 19, 20 | Distinct individual-related number |
| . | . | . | . | . |
| . | . | . | . | . |
| . | . | . | . | . |
| Test station 4 | Test date | 4 | 43 ... 46 | UNIX date |
| | Test station number | 2 | 47, 48 | Distinct consecutive number |
| | Software status | 3 | 49 | Compatibility version |
| | | | 50 | Function/defective version |
| | | | 51 | Customer-specific/test version |
| | Tester | 2 | 52, 53 | Distinct individual-related number |
| Unassigned | | 10 | 54 ... 63 | |
| Device-specific data | | 64 | 64 ... 127 | E.g., calibration data |
| | | Σ 128 Byte | | |

After undergoing all manufacturing and testing steps, the individual subassemblies 12-16 are assembled into an electronic module 11 by means of electric plug-type connections or by means of no longer separable, electrically conductive connecting means (e.g., soldered connection).

The microprocessor 22 is electrically connected to the storage devices 17-21 after the subassemblies 12-16 have been assembled into the electronic module 11. During the initial start-up that follows the assembly of the electronic module 11, the individual storage devices 17-21 are read out by the microprocessor 22.

Based on this data read-out, the microprocessor 22 can carry out a configuration, a verification and/or a calibration of the individual subassemblies, of the electronic module and consequently of the sensor.

During the configuration, the microprocessor 22 can check the correct assembly in accordance with the specifications of the manufacturing order. For this purpose, the subassembly 12-16 can be recognized based on manufacturing data (e.g., an identification code or a serial number) or based on test data determined by means of functional tests of the subassemblies, namely by comparing the data content of the respective storage devices 17-21 with the data content expected by the microprocessor based on the manufacturing order or based on the microprocessor model. In addition, the microprocessor 22 can independently configure the electronic module 11 and During the verification, the test data of the respective storage devices 17-21 is evaluated as to the fact whether all tests were successfully passed in order to ensure that no subassemblies are delivered that have not successfully passed all tests. For this purpose, the status of the tests is evaluated by means of the data content read out of the storage device.

During the calibration, test data such as, for example, adjustment values that are related to individual subassemblies are transferred for the operation of the electronic module 11. For example, the calibration data of a D/A converter drive control for generating the current output level of the power supply subassembly 14 is acquired during the functional test of the power supply subassembly 14 and stored as test data in the storage device 19 of the power supply subassembly 14. After the assembly of the electronic module, this acquired calibration data can be used by the microprocessor 22 for controlling the power supply subassembly 14 such that the level sensor has the required current output level. Until now, this required a manual calibration of the current output at the final adjustment station of the level sensors.

Another function that can be realized due to the storage of the manufacturing and/or test data is a copy protection or manufacturer verification, respectively. In this case, the content of the storage devices 17-21 comprises an identification code or a distinct serial number, wherein the recipient is informed of the serial number range of each shipment during the delivery of the components. These serial numbers can be read out from the completed device and therefore serve as verification that the electronic module actually originates from a certain manufacturer.

Figure 2:
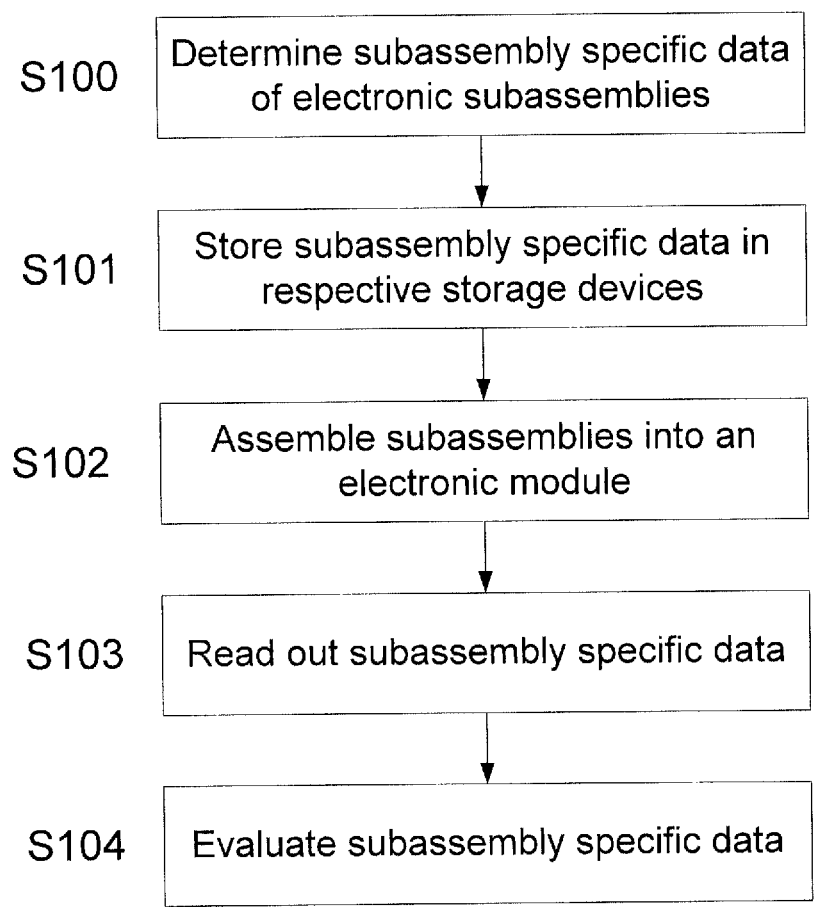
FIG. 2 shows an exemplary embodiment according to the present invention of method for manufacturing a sensor.

FIG. 2 shows the inventive method for manufacturing a sensor. In this method, subassembly-specific data of several electronic subassemblies 12-16 is determined in step S100. Subsequently, the subassembly-specific data is stored in the respective storage devices 17-21 of the subassemblies 12-16 in step S101. These subassemblies 12-16 are assembled into an electronic module 11 in step S102, wherein the subassemblies 12-16 are electrically coupled to a processor 22. During the initial start-up, the data that can thusly be accessed by the processor 22 is read out in step S103 and evaluated in a subsequent step S104.

As a supplement, it should be noted that "comprising" and "featuring" do not exclude other elements or steps, and that "an" or "a" does not exclude a plurality. It should furthermore be noted that features or steps that were described with reference to one of the above additional developments can also be used in combination with other features or steps of other above-described additional developments.

The invention claimed is:

1. A method for manufacturing a sensor, comprising:
   determining subassembly-specific data of each of a plurality of electronic subassemblies, the data comprising test data determined using functional tests of the respective subassembly, the functional tests being performed before assembly of the subassemblies into an electronic module of the sensor;
   storing the subassembly-specific data in respective storage devices of the subassemblies;
   assembling the subassemblies into the electronic module;
   electrically coupling the subassemblies to a processor of the electronic module;
   reading out the data from the storage devices by the processor during an initial start-up of the sensor; and
   evaluating the storage device contents by means of the processor;
   wherein the processor uses the data to check if a respective subassembly has successfully passed a functional test of the subassembly, to check if the subassemblies of the electronic module were assembled correctly, and to perform a calibration of the electronic module using the test data of the respective subassembly;
   wherein the data comprises an identification code for identifying the subassembly or the manufacturer;
   wherein the data is evaluated by the processor before starting an operating mode of the sensor.

2. The method of claim 1, further comprising:
   configuring an operation of the electronic module as a function of the data.

3. A sensor, comprising:
   an electronic module installed in the sensor and including an assembly of electronic subassemblies, wherein each subassembly includes a programmable storage device with subassembly-specific data of the respective subassembly comprising test data determined using functional tests of the respective subassembly, the functional tests being performed before assembly of the subassemblies into the electronic module; and
   a processor electrically coupled to the subassemblies,
   wherein content of the respective programmable storage devices is read out and evaluated by the processor;
   wherein the processor evaluates the data to check if a respective subassembly has successfully passed a functional test of the subassembly, to check if the subassemblies of the electronic module were assembled correctly, and to perform a calibration of the electronic module using the test data of the respective subassembly;
   wherein the data comprises an identification code for identifying the subassembly or the manufacturer;
   wherein the data is evaluated by the processor before starting an operating mode of the sensor.

4. The sensor of claim 3, wherein the storage devices include non-volatile storage devices.

5. The sensor of claim 3, wherein the identification code is a serial number.

6. The sensor of claim 3, wherein the test data comprises measured values of the subassembly that were determined by means of tests.

7. The sensor according to claim 3, wherein the test data includes manufacturing irregularities of the subassembly that were determined using tests.

8. The sensor of claim 3, wherein an operation of the electronic module is configured as a function of the data.

9. The sensor of claim 3, wherein an operation of the electronic module is calibrated as a function of the data.

10. The sensor of claim 3, wherein the data includes information on a type of functional tests carried out on the subassembly and wherein the data is verified with data expected by the processor in order to check a completeness of the functional tests of the subassemblies.

11. The sensor of claim 3, wherein the subassemblies include at least one of a microwave subassembly, an interface subassembly, a power supply subassembly, a detector subassembly and a frequency control subassembly.

12. The sensor of claim 3, wherein the sensor includes a level sensor.

* * * * *